United States Patent [19]

Miyano et al.

[11] Patent Number: 5,587,839
[45] Date of Patent: Dec. 24, 1996

[54] OBJECTIVE LENS SYSTEM FOR ENDOSCOPE

[75] Inventors: Hitoshi Miyano; Chikara Yamamoto, both of Saitama-ken, Japan

[73] Assignee: Fuji Photo Optical Co., Ltd., Saitama-ken, Japan

[21] Appl. No.: 544,003

[22] Filed: Oct. 17, 1995

[30] Foreign Application Priority Data

Oct. 18, 1994 [JP] Japan .................................. 6-251976

[51] Int. Cl.⁶ ............................. G02B 21/02; G02B 9/34
[52] U.S. Cl. ............................................. 359/660; 359/783
[58] Field of Search ................................... 359/656, 657, 359/658, 659, 660, 783

[56] References Cited

U.S. PATENT DOCUMENTS

| | | | |
|---|---|---|---|
| 4,493,537 | 1/1985 | Nakahashi | 359/783 |
| 4,984,878 | 1/1991 | Miyano | 359/783 |
| 5,198,931 | 3/1993 | Igarashi | 359/783 |

FOREIGN PATENT DOCUMENTS 2188709  7/1990  Japan .

*Primary Examiner*—Scott J. Sugarman
*Attorney, Agent, or Firm*—Sixbey, Friedman, Leedom & Ferguson, P.C.; Gerald J. Ferguson, Jr.

[57] ABSTRACT

An objective lens system for an endoscope includes first to fifth lens elements $L_1$ to $L_5$ arranged in this order from the front to the rear. An aperture stop is disposed between the second and third lens elements $L_2$ and $L_3$. The first lens element $L_1$ is a negative lens concave to the rear, the second lens element $L_2$ is a positive lens having a flat surface facing rearward, the third lens element $L_3$ is a positive lens having a flat surface facing forward, the fourth lens element $L_4$ is a positive lens having a flat surface facing forward and the fifth lens element $L_5$ is a negative meniscus lens. The fourth and fifth lens elements $L_4$ and $L_5$ are cemented together to form a cemented lens having a positive refracting power. The following formulae (1) to (3) are satisfied, $$0.75 < |f_1 \times Bf/f^2| < 1.45 \quad (1)$$

$$D_i < |R_i| \quad (2)$$

$$\nu_2 < 45 \quad (3)$$

wherein $f_1$ represents the focal length of the first lens element $L_1$, Bf represents the back focal length of the overall objective lens system, f represents the combined focal length of the overall objective lens system, $D_i$ represents the central thickness of an lens element $L_i$ having a convex face, $R_i$ represents the radius of curvature of the convex face of an lens element $L_i$ having a convex face and $\nu_2$ represents the Abbe's number of the second lens element $L_2$.

2 Claims, 5 Drawing Sheets

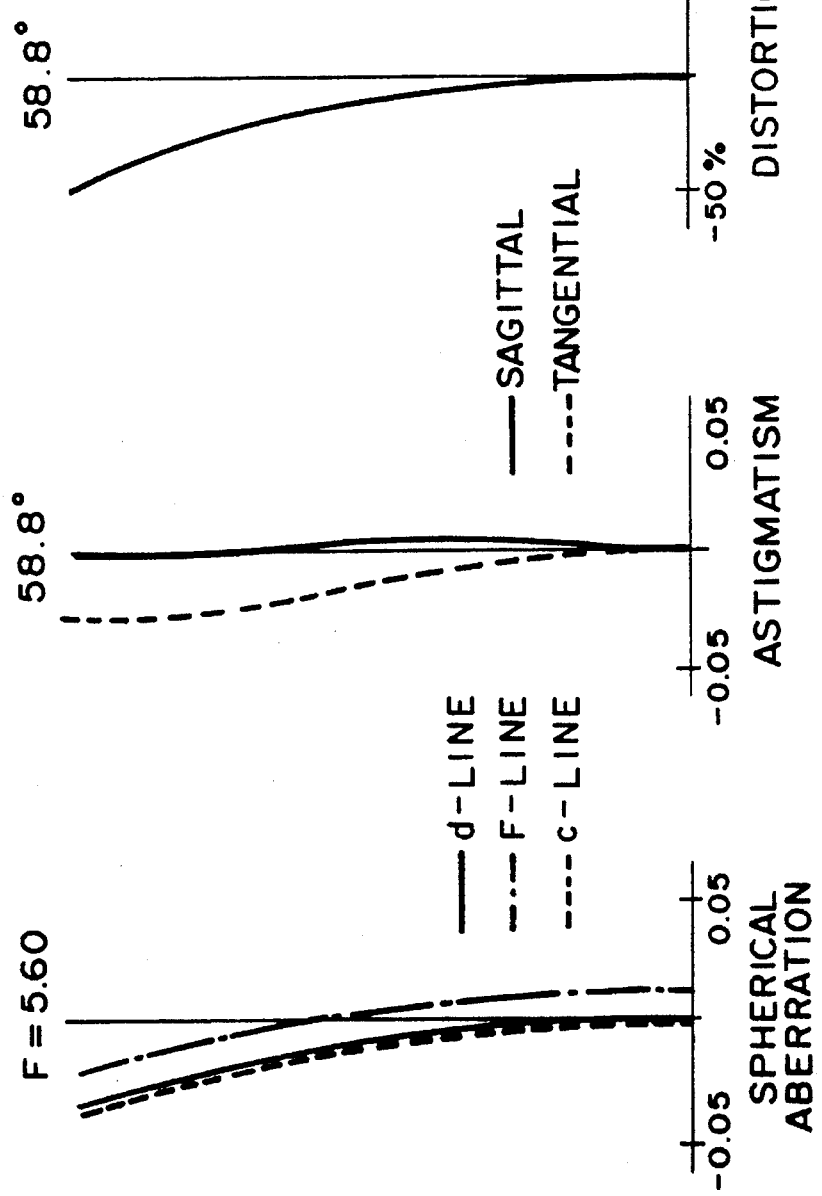

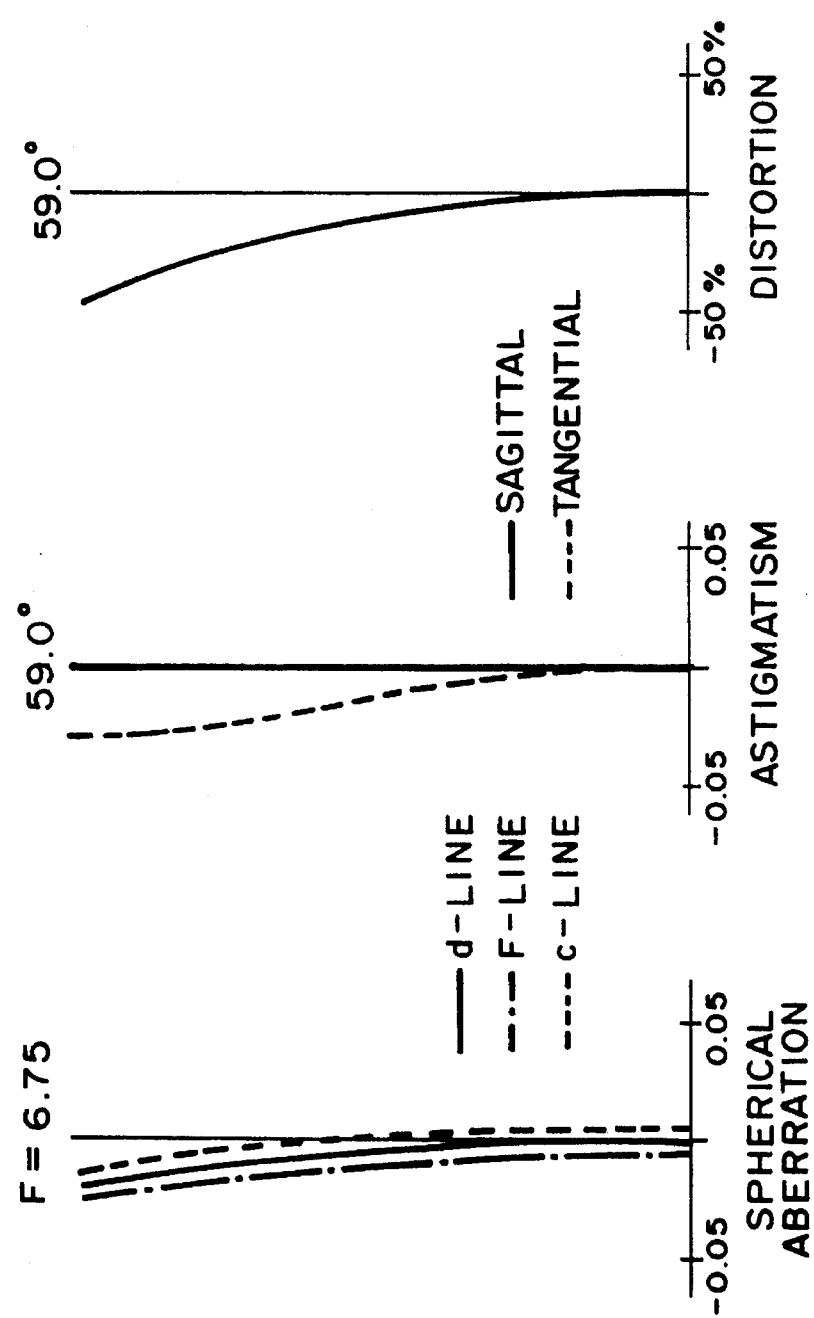

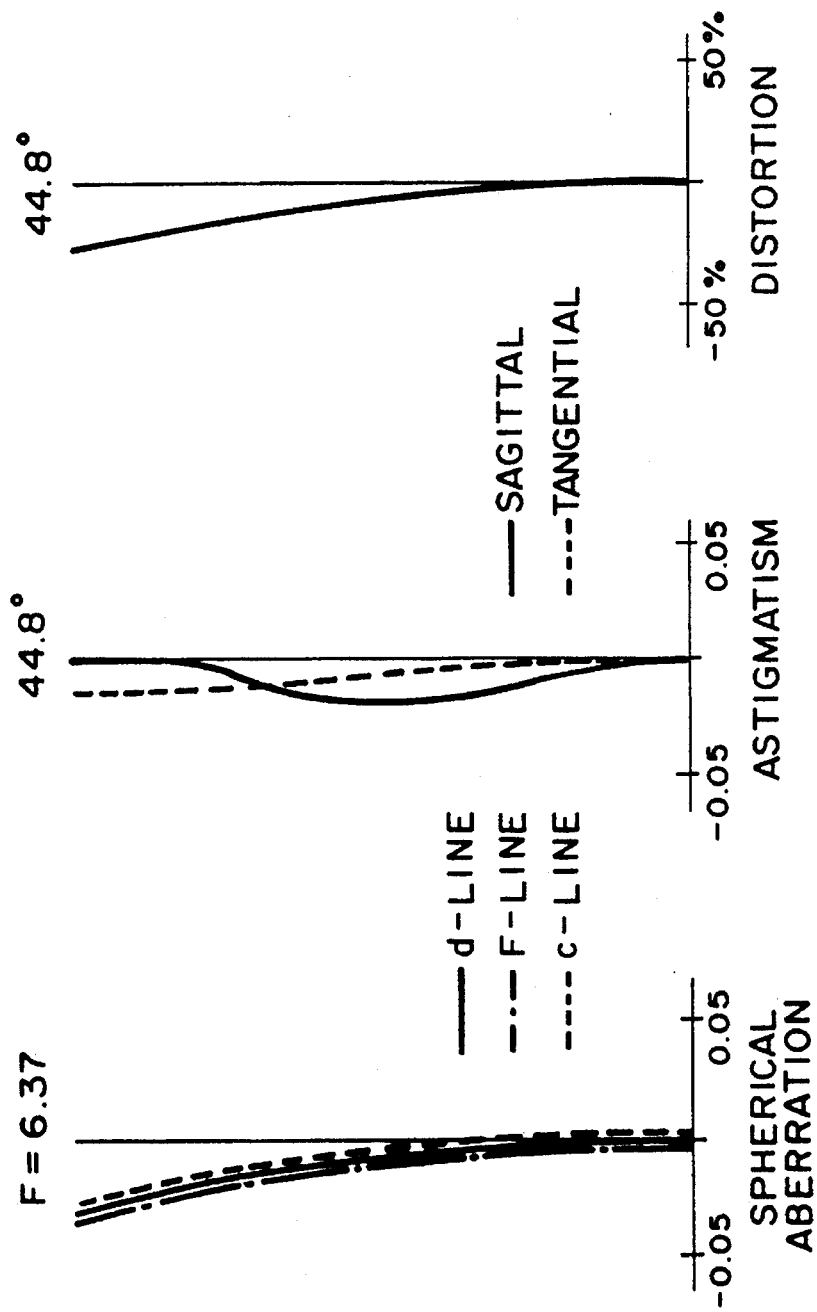

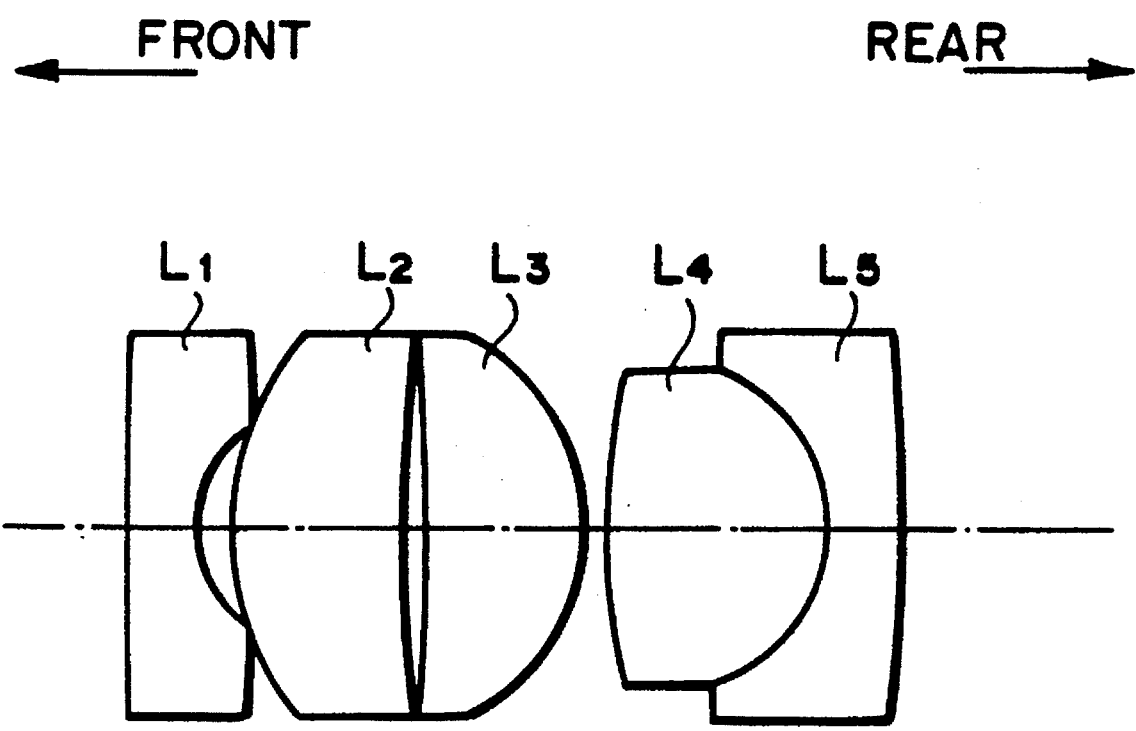

OBJECTIVE LENS SYSTEM FOR ENDOSCOPE

BACKGROUND OF THE INVENTION

1. Field of the Invention

This invention relates to an objective lens system which is disposed at the tip of an endoscope.

2. Description of the Related Art

As an objective lens system for an endoscope, various lens systems have been developed. Since being disposed at the tip of the endoscope which is inserted into a human body or a fine space, the objective lens system must be very small in size.

In such a small size objective lens system, it is important that the lateral color aberration is excellent. As an objective lens system excellent in the lateral color aberration, there has been known one disclosed our Japanese Unexamined Patent Publication No. 2(1990)-188709.

The objective lens system for an endoscope disclosed in the patent publication comprises first to fifth lens elements $L_1$ to $L_5$ and an aperture stop is disposed between the second and third lens elements $L_2$ and $L_3$ as shown in FIG. 5.

Since the objective lens system for an endoscope must be very small in size, high technique is required to process the lens elements and to assemble them into an objective lens system, which takes large labor and a long time. Accordingly the objective lens system for an endoscope is much higher in cost than other lens systems.

Especially in the objective lens system shown in FIG. 5, an aperture stop in the form of a flat plate is disposed between the opposed curved surfaces of the second and third lens elements $L_2$ and $L_3$. Since the optical elements in the lens system are very small in size as described above, it is very difficult to position the flat plate with high accuracy, which adds to manufacturing cost of the lens system.

SUMMARY OF THE INVENTION

In view of the foregoing observations and description, the primary object of the present invention is to provide an objective lens system for an endoscope which is excellent in performances and low in lens processing cost and/or assembly cost and can be manufactured at low cost.

The objective lens system for an endoscope in accordance with the present invention comprises first to fifth lens elements L1 to L5 arranged in this order from the front (the object side) to the rear (the image side) and an aperture stop disposed between the second and third lens elements L2 and L3, the first lens element L1 being a negative lens concave to the rear, the second lens element L2 being a positive lens having a flat surface facing rearward, the third lens element L3 being a positive lens having a flat surface facing forward, the fourth lens element L4 being a positive lens having a flat surface facing forward, the fifth lens element L5 being a negative meniscus lens, the fourth and fifth lens elements L4 and L5 being cemented together to form a cemented lens having a positive refracting power wherein the following formulae (1) to (3) are satisfied, $$0.75 < |f_1 \times Bf/f^2| < 1.45 \tag{1}$$

$$D_i < |R_i| \tag{2}$$

$$\nu_2 < 45 \tag{3}$$

wherein $f_1$ represents the focal length of the first lens element $L_1$, Bf represents the back focal length of the overall objective lens system, f represents the combined focal length of the overall objective lens system, $D_i$ represents the central thickness of an lens element $L_i$ having a convex face, $R_i$ represents the radius of curvature of the convex face of an lens element $L_i$ having a convex face and $\nu_2$ represents the Abbe's number of the second lens element $L_2$.

Preferably the following formula (4) is satisfied $$0.15 < |\beta| \tag{4}$$

wherein $\beta$ represents the magnification of the cemented lens in service.

In the objective lens system of the present invention, the rear face of the second lens element $L_2$ and the front faces of the third and fourth lens elements $L_3$ and $L_4$, which are curved faces in the conventional objective lens systems for an endoscope, are flat. Accordingly processing of the three lens faces is facilitated and the manufacturing cost of the objective lens system can be reduced.

Further since the rear face of the second lens element $L_2$ and the front face of the third lens element $L_3$ between which the aperture stop generally in the form of a thin flat plate is sandwiched are both flat, the aperture stop can be surely sandwiched therebetween, whereby error in assembly can be reduced to facilitate assembly of the objective lens system and the assembly cost can be reduced.

Further when the front face of the fourth lens element $L_4$, that is, the front face of the cemented lens (formed by the fourth and fifth lens elements $L_4$ and $L_5$), is flat, a mask for shutting off ghost generated by a prism of the like disposed behind the cemented lens can be easily mounted on the front face of the fourth lens element $L_4$, whereby difficulties in incorporating such a mask into the lens system can be overcome.

Further when the front face of the fourth lens element $L_4$ is flat, application of a multi-layered wavelength-selective coating is facilitated.

The formula (1) defines the condition for ensuring a sufficient back focal length of the objective lens system required to insert a prism and/or filters into the lens system. When $|f_1 \times Bf/f^2|$ is not larger than 0.75, the back focal length becomes too short and the refracting power of the first lens element $L_1$ becomes too strong to well correcting aberrations of the lens system. On the other hand, when $|f_1 \times Bf/f^2|$ is not smaller than 1.45, the back focal length becomes too long and the refracting power of the first lens element $L_1$ becomes too weak to well correcting aberrations of the lens system.

When the formula (2) is satisfied, the convex face of the lens element before centering does not have a curvature larger than a hemisphere, whereby lens processing cost is reduced.

When the formula (3) is satisfied, color aberration, especially lateral color aberration, is well corrected.

The formula (4) is for suppressing generation of ghost which is generated when light rays incident to the image plane is reflected at the image plane and then reflected at the front face of the cemented lens. When the formula (4) is satisfied, generation of ghost can be suppressed by enlarging the magnification of the objective lens system to some extent.

BRIEF DESCRIPTION OF THE DRAWINGS

FIG. 5 is a schematic view showing the basic arrangement of the lens elements in the objective lens system of the prior art.

DESCRIPTION OF THE PREFERRED EMBODIMENT

Figure 1:
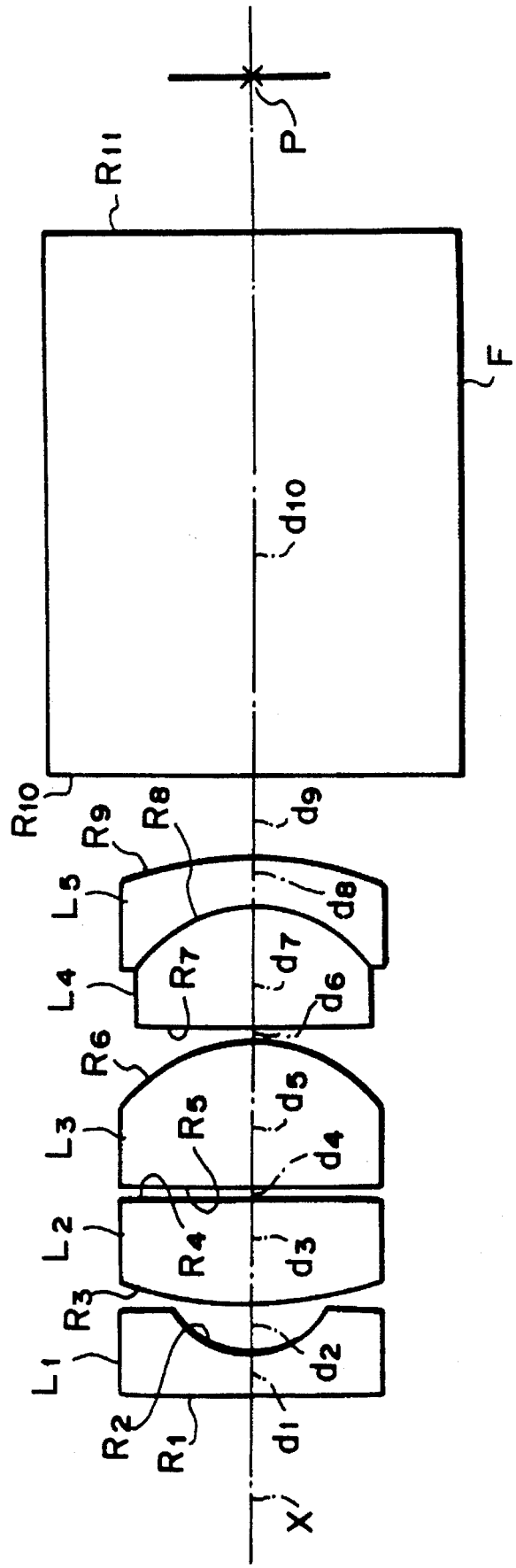
FIG. 1 is a schematic view showing the basic arrangement of the lens elements in the objective lens system of the present invention, FIGS. 2A to 2D respectively show spherical aberration, astigmatism, distortion and lateral color aberration of the objective lens system in accordance with the first embodiment of the present invention, FIGS. 3A to 3D respectively show spherical aberration, astigmatism, distortion and lateral color aberration of the objective lens system in accordance with the second embodiment of the present invention, FIGS. 4A to 4D respectively show spherical aberration, astigmatism, distortion and lateral color aberration of the objective lens system in accordance with the third embodiment of the present invention.

As shown in FIG. 1, the objective lens systems in accordance with first to third embodiments of the present invention generally comprise first to fifth lens elements $L_1$ to $L_5$ arranged in this order from the front (the side of the object) to the rear, and light rays incident on the objective lens system from the front in parallel to the optical axis X are focused on a CCD in an image position P through a low-pass filter (prism) F formed of a quarts plate (glass plate).

The first lens element $L_1$ is a negative plano-concave lens having the flat face faced to the front, the second lens element $L_2$ is a positive plano-convex lens having the convex face and the flat face respectively faced to the front and the rear, the third lens element $L_3$ is a positive plano-convex lens having the flat face and the convex face respectively faced to the front and the rear, the fourth lens element $L_4$ is a positive plano-convex lens having the flat face and the convex face respectively faced to the front and the rear, and the fifth lens element $L_5$ is a negative meniscus lens having the face of greater curvature (concave surface) faced to the front. The fourth and fifth lens elements $L_4$ and $L_5$ are cemented into a cemented lens.

In the first to third embodiments, the following formulae (1) to (3) are satisfied.

$$0.75 < |f_1 \times Bf/f^2| < 1.45 \quad (1)$$

$$D_i < |R_i| \quad (2)$$

$$v_2 < 45 \quad (3)$$

wherein $f_1$ represents the focal length of the first lens element $L_1$, Bf represents the back focal length of the overall objective lens system, f represents the combined focal length of the overall objective lens system, $D_i$ represents the central thickness of an lens element $L_i$ having a convex face, $R_i$ represents the radius of curvature of the convex face of an lens element $L_i$ having a convex face and $v_2$ represents the Abbe's number of the second lens element $L_2$.

Further the following formula (4) is satisfied $$0.15 < |\beta| \quad (4)$$

wherein $\beta$ represents the magnification of the cemented lens in service.

When the formula (1) is satisfied, the objective lens system can be moderate in back focal length and can be excellent in aberrations. When the formula (2) is satisfied, lens processing is facilitated. When the formula (3) is satisfied lateral color aberration can be excellent. Further when the formula (4) is satisfied, generation of ghost can be suppressed.

First Embodiment

The radii of curvature R (mm) of the refracting surfaces, the axial surface separations d (the central thicknesses of the lens elements or the air separations), the refractive indexes $n_d$ for the sodium d-line of the lens elements and the Abbe's number $v_d$ of the lens elements in the objective lens system in accordance with a first embodiment of the present invention are as shown in the following table 1. In table 1, the numbers in the leftmost column designates the numbers of the symbols R, d, $n_d$ and $v_d$ as numbered from the front. (the same for all the tables in this specification)

TABLE 1

| | R | d | $n_d$ | $v_d$ |
|---|---|---|---|---|
| 1 | ∞ | 0.216 | 1.88300 | 41.0 |
| 2 | 0.480 | 0.221 | | |
| 3 | 1.967 | 0.518 | 1.80518 | 25.4 |
| 4 | ∞ | 0.027 | | |
| 5 | ∞ | 0.696 | 1.71300 | 53.9 |
| 6 | −0.864 | 0.054 | | |
| 7 | ∞ | 0.572 | 1.62041 | 60.3 |
| 8 | −0.674 | 0.216 | 1.80518 | 25.4 |
| 9 | −1.800 | 0.404 | | |
| 10 | ∞ | 2.540 | 1.51633 | 64.1 |
| 11 | ∞ | | | |

In the first embodiment, $|f_1 \times Bf/f^2|$ is 1.11, $v_2$ is 25.4 and $|\beta|$ is 0.63.

Second Embodiment

The radii of curvature R (mm) of the refracting surfaces, the axial surface separations d (the central thicknesses of the lens elements or the air separations), the refractive indexes $n_d$ for the sodium d-line of the lens elements and the Abbe's number $v_d$ of the lens elements in the objective lens system in accordance with a second embodiment of the present invention are as shown in the following table 2.

TABLE 2

| | R | d | $n_d$ | $v_d$ |
|---|---|---|---|---|
| 1 | ∞ | 0.313 | 1.81550 | 44.4 |
| 2 | 0.551 | 0.251 | | |
| 3 | 2.307 | 0.791 | 1.80518 | 25.4 |
| 4 | ∞ | 0.039 | | |
| 5 | ∞ | 0.658 | 1.71300 | 53.9 |
| 6 | −1.082 | 0.180 | | |
| 7 | ∞ | 0.822 | 1.62041 | 60.3 |
| 8 | −0.826 | 0.313 | 1.80518 | 25.4 |
| 9 | −1.601 | 0.392 | | |
| 10 | ∞ | 2.506 | 1.51633 | 64.1 |
| 11 | ∞ | | | |

In the second embodiment, $|f_1 \times Bf/f^2|$ is 1.28, $v_2$ is 25.4 and $|\beta|$ is 0.44.

Third Embodiment

The radii of curvature R (mm) of the refracting surfaces, the axial surface separations d (the central -thicknesses of the lens elements or the air separations), the refractive indexes $n_d$ for the sodium d-line of the lens elements and the Abbe's number $v_d$ of the lens elements in the objective lens system in accordance with a third embodiment of the present invention are as shown in the following table 3.

TABLE 3

|    | R      | d     | $n_d$   | $v_d$ |
|----|--------|-------|---------|-------|
| 1  | ∞      | 0.254 | 1.81550 | 44.4  |
| 2  | 0.566  | 0.134 |         |       |
| 3  | 1.116  | 0.827 | 1.72342 | 38.0  |
| 4  | ∞      | 0.032 |         |       |
| 5  | ∞      | 0.515 | 1.72000 | 50.3  |
| 6  | −0.879 | 0.064 |         |       |
| 7  | ∞      | 0.541 | 1.72000 | 50.3  |
| 8  | −0.713 | 0.254 | 1.78472 | 25.7  |
| 9  | −2.818 | 0.725 |         |       |
| 10 | ∞      | 0.960 | 1.51633 | 64.1  |
| 11 | ∞      |       |         |       |

In the third embodiment, $|f1 \times Bf/f^2|$ is 0.94, $v_2$ is 38.0 and $|\beta|$ is 0.73.

Spherical aberration, astigmatism, distortion and lateral color aberration of the first embodiment are as shown in FIGS. 2A to 2D, respectively, those of the second embodiment are as shown in FIGS. 3A to 3D, respectively and those of the third embodiment are as shown in FIGS. 4A to 4D, respectively.

As can be understood from FIGS. 2A to 2D, 3A to 3D and 4A to 4D, the objective lens systems for an endoscope in accordance with the first to third embodiments of the present invention are excellent in each of the aberrations including the lateral color aberration.

The objective lens systems for an endoscope of the present invention need not be limited to those described above but may be variously modified. For example, the radius of curvature of each refracting surface, the axial surface separations d, the thickness of the low-pass filter and the like may be changed.

What is claimed:

1. An objective lens system for an endoscope comprising first to fifth lens elements $L_1$ to $L_5$ arranged in this order from the front to the rear and an aperture stop disposed between the second and third lens elements $L_2$ and $L_3$, the first lens element $L_1$ being a negative lens concave to the rear, the second lens element $L_2$ being a positive lens having a flat surface facing rearward, the third lens element $L_3$ being a positive lens having a flat surface facing forward, the fourth lens element $L_4$ being a positive lens having a flat surface facing forward, the fifth lens element $L_5$ being a negative meniscus lens, the fourth and fifth lens elements $L_4$ and $L_5$ being cemented together to form a cemented lens having a positive refracting power wherein the following formulae (1) to (3) are satisfied, $$0.75 < |f_1 \times Bf/f^2| < 1.45 \quad (1)$$

$$D_i < |R_i| \quad (2)$$

$$v_2 < 45 \quad (3)$$

wherein $f_1$ represents the focal length of the first lens element $L_1$, Bf represents the back focal length of the overall objective lens system, f represents the combined focal length of the overall objective lens system, $D_i$ represents the central thickness of an lens element $L_i$ having a convex face, $R_i$ represents the radius of curvature of the convex face of an lens element Li having a convex face and $v_2$ represents the Abbe's number of the second lens element $L_2$.

2. An objective lens system as defined in claim 1 in the following formula (4) is further satisfied $$0.15 < |\beta| \quad (4)$$

wherein $\beta$ represents the magnification of the cemented lens in service.

* * * * *